(12) United States Patent
Kwon et al.

(10) Patent No.: US 11,285,834 B2
(45) Date of Patent: Mar. 29, 2022

(54) VEHICLE CONDITION MONITORING AND DIAGNOSIS METHOD AND SYSTEM USING CHARGER

(71) Applicants: Hyundai Motor Company, Seoul (KR); KIA Motors Corporation, Seoul (KR)

(72) Inventors: Hae Yun Kwon, Bucheon-si (KR); So Jin Lee, Yongin-si (KR)

(73) Assignees: Hyundai Motor Company; KIA Motors Corporation

( * ) Notice: Subject to any disclaimer, the term of this patent is extended or adjusted under 35 U.S.C. 154(b) by 544 days.

(21) Appl. No.: 16/204,535

(22) Filed: Nov. 29, 2018

(65) Prior Publication Data

US 2020/0079238 A1    Mar. 12, 2020

(30) Foreign Application Priority Data

Sep. 10, 2018  (KR) .................. 10-2018-0107582

(51) Int. Cl.
*B60L 53/60* (2019.01)
*G07C 5/08* (2006.01)
(Continued)

(52) U.S. Cl.
CPC ............ *B60L 53/60* (2019.02); *G07C 5/0808* (2013.01); *H04B 3/542* (2013.01); *H04B 3/544* (2013.01);
(Continued)

(58) Field of Classification Search
CPC ................. B60L 53/60; G07C 5/0808; H04B 3/542–544; H04L 2012/40215–40273
See application file for complete search history.

(56) References Cited

U.S. PATENT DOCUMENTS

2011/0276194 A1* 11/2011 Emalfarb ................ B60L 53/14
700/297
2012/0095830 A1* 4/2012 Contreras Delpiano ...................
B60L 53/64
705/14.49
(Continued)

FOREIGN PATENT DOCUMENTS

JP          2010136521 A       6/2010
KR     10-2014-0062300        5/2014
(Continued)

*Primary Examiner* — Calvin Cheung
(74) *Attorney, Agent, or Firm* — Lempia Summerfield Katz LLC

(57) ABSTRACT

The vehicle condition monitoring and diagnosis method includes the steps of preparing a wired communication path between a gateway and the charger of a vehicle, initiating first communication to charge a battery supplying power to a driving motor between the gateway and the charger through the wired communication path, initiating charging according to a result of the first communication, receiving, by the gateway, a vehicle condition monitoring and diagnosis request from the charger through the first communication, and connecting the gateway to the charger through second communication to transmit vehicle condition monitoring and diagnostic information separately from the charging through the wired communication path, if the gateway is capable of performing vehicle condition monitoring and diagnosis according to the vehicle condition monitoring and diagnosis request.

17 Claims, 7 Drawing Sheets

(51) Int. Cl.
*H04B 3/54* (2006.01)
*H04L 12/40* (2006.01)

(52) U.S. Cl.
CPC ............ *H04L 2012/40215* (2013.01); *H04L 2012/40273* (2013.01)

(56) References Cited

U.S. PATENT DOCUMENTS

| | | | |
|---|---|---|---|
| 2013/0020992 A1* | 1/2013 | Wu | H04L 67/12 320/109 |
| 2013/0162221 A1 | 6/2013 | Jefferies et al. | |
| 2014/0203077 A1* | 7/2014 | Gadh | H02J 13/00012 235/382 |
| 2014/0337253 A1* | 11/2014 | Berezin | G06Q 50/06 705/412 |
| 2015/0352969 A1* | 12/2015 | Ando | B60L 53/18 320/109 |
| 2016/0021127 A1* | 1/2016 | Yan | H04L 63/1416 726/23 |
| 2016/0046196 A1* | 2/2016 | Baek | B60L 53/62 320/109 |
| 2016/0096438 A1* | 4/2016 | Grimes | B60L 53/18 320/109 |
| 2016/0137087 A1* | 5/2016 | Haas | B60L 58/10 320/109 |
| 2017/0088001 A1* | 3/2017 | Haas | B60L 53/14 |
| 2019/0061547 A1* | 2/2019 | Vargas-Reighley | H04L 67/125 |
| 2019/0061552 A1* | 2/2019 | Amari | B60L 53/665 |
| 2019/0280509 A1* | 9/2019 | Yokoyama | H02J 3/38 |

FOREIGN PATENT DOCUMENTS

| | | |
|---|---|---|
| KR | 101450166 B1 * | 10/2014 |
| KR | 10-2016-0102130 | 8/2016 |
| KR | 10-2018-0032373 | 3/2018 |
| KR | 10-1848610 B | 4/2018 |

\* cited by examiner

VEHICLE CONDITION MONITORING AND DIAGNOSIS METHOD AND SYSTEM USING CHARGER

CROSS-REFERENCE TO RELATED APPLICATION

This application claims priority to and the benefit of Korean Patent Application No. 10-2018-0107582, filed on Sep. 10, 2018, which is incorporated herein by reference in its entirety.

FIELD

The present disclosure relates to a vehicle condition monitoring and diagnosis method and system using a charger.

BACKGROUND

The statements in this section merely provide background information related to the present disclosure and may not constitute prior art.

In general, as demand for eco-friendly vehicles increases, monitoring and diagnosis services provided to customers are increased. Accordingly, eco-friendly vehicles (electric/hybrid vehicles) perform controller area network (CAN) communication of a charging-related electronic control unit (ECU) applied to the vehicles and Ethernet communication and power line communication (PLC) through a charger and control charging-related functions, through a gateway (charging control module) controller.

FIG. 1 is a block diagram illustrating a configuration of conventional electric vehicle charging technology.

Referring to FIG. 1, a charger 200 may transmit charging information to a gateway 110 applied to a CAN controller 120 through PLC via charging cables, and perform charging control. The gateway 110 may perform charging control based on the charging information received from the CAN controller 120 and the charger 200.

An inlet 130 may be connected to the charging cable of the charger 200. The inlet 130 may measure frequency output. That is, the inlet 130 may measure PLC power of a vehicle.

However, in the conventional technology, CAN communication applied to the current vehicle is controlled through a CAN message, and PLC controls charging/diagnostic information and a vehicle condition of the eco-friendly vehicle through an Ethernet message.

Accordingly, technology in which a customer may monitor and diagnose a vehicle condition using time and infrastructure which eco-friendly vehicles use during charging has been desired.

The above information disclosed in this Background section is only for enhancement of understanding of the background of the present disclosure, and therefore it may contain information that does not form the prior art that is already know to a person of ordinary skill in the art.

SUMMARY

The present disclosure is directed to a vehicle condition monitoring and diagnosis method and system for a vehicle with a battery and a drive motor using a charger.

The present disclosure provides a vehicle condition monitoring and diagnosis method and system using a charger which inspect an eco-friendly vehicle and monitor the vehicle condition during charging separately from conventional charging, through use of a different port and connection to a different socket from those used in transmission and reception of charging-related information executed through PLC lines.

The vehicle condition monitoring and diagnosis method using a charger includes the steps of preparing a wired communication path between a gateway and the charger of a vehicle, initiating first communication to charge a battery to supply power to a driving motor between the gateway and the charger through the wired communication path, initiating charging according to a result of the first communication, receiving, by the gateway, a vehicle condition monitoring and diagnosis request from the charger through the first communication, and connecting the gateway to the charger through second communication to transmit vehicle condition monitoring and diagnostic information separately from the charging through the wired communication path, if the gateway is capable of performing vehicle condition monitoring and diagnosis according to the vehicle condition monitoring and diagnosis request.

The receiving, by the gateway, the vehicle condition monitoring and diagnosis request from the charger through the first communication may include, when the charger and the gateway are connected by the first communication, receiving, by the gateway, vehicle condition monitoring and diagnosis request information transmitted by the charger through an Ethernet signal.

According to a further aspect of the present disclosure, the vehicle condition monitoring and diagnosis method may further include the step of receiving, by the gateway, charger information transmitted by the charger through the first communication and confirming whether the charger is capable of performing vehicle condition monitoring and diagnosis through the charger information.

The vehicle condition monitoring and diagnosis method may further include the step of performing message SID filtering, in response to the vehicle condition monitoring and diagnosis request from the charger, selectively receiving information necessary for vehicle condition monitoring and diagnosis from the vehicle through the message SID filtering and transmitting a CAN signal to request the received information to a CAN controller of the vehicle, receiving the vehicle condition monitoring and diagnostic information from the CAN controller of the vehicle through a CAN signal, and converting the received CAN signal into an Ethernet message.

The second communication may be configured to transceive Ethernet messages through a TCP/IP socket as a communication socket.

According to further aspect of the present disclosure, the vehicle condition monitoring and diagnosis method may further include the steps of receiving and collecting, by a server, the vehicle condition monitoring and diagnostic information from the charger, and analyzing, by the server, the collected vehicle condition monitoring and diagnostic information.

The vehicle condition monitoring and diagnosis method may further include the step of requesting, by a service terminal, vehicle condition monitoring.

The vehicle condition monitoring and diagnosis method may further include the steps of receiving, by the service terminal, a vehicle condition monitoring and diagnosis result, acquired by analysis through the server, and outputting, by the service terminal, the vehicle condition monitoring and diagnosis result.

The outputting, by the service terminal, the vehicle condition monitoring and diagnosis result may include outputting a battery capacity, charging performance, a software state, and a regular inspection date.

According to another aspect of the present disclosure, a vehicle condition monitoring and diagnosis system for a vehicle with a battery and a drive motor using a charger includes the charger configured to perform vehicle charging, and a vehicle comprising a gateway and a CAN controller connected to the charger through a wired communication path so as to control charging of the vehicle, wherein the gateway initiates first communication to charge a battery to supply power to a driving motor between the gateway and the charger through the wired communication path, receives a vehicle condition monitoring and diagnosis request from the charger through the first communication, if charging is initiated according to a result of the first communication, and is connected to the charger through second communication to transmit vehicle condition monitoring and diagnostic information separately from the charging through the wired communication path, if the gateway is capable of performing vehicle condition monitoring and diagnosis according to the vehicle condition monitoring and diagnosis request.

The gateway may receive vehicle condition monitoring and diagnosis request information transmitted by the charger through an Ethernet signal, when the charger and the gateway are connected by the first communication.

The gateway may receive charger information transmitted by the charger through the first communication and confirm whether the charger is capable of performing vehicle condition monitoring and diagnosis through the charger information.

According to further aspect of the present disclosure, the gateway may perform message SID filtering, in response to the vehicle condition monitoring and diagnosis request from the charger, selectively receive information necessary for vehicle condition monitoring and diagnosis from the vehicle through the message SID filtering and transmits a CAN signal to request the received information to a CAN controller of the vehicle, receive the vehicle condition monitoring and diagnostic information from the CAN controller of the vehicle through a CAN signal, and convert the received CAN signal into an Ethernet message corresponding to the vehicle condition monitoring and diagnostic information.

The second communication may be configured to transceive Ethernet messages through a TCP/IP socket as a communication socket.

According to further aspect of the present disclosure, the vehicle condition monitoring and diagnosis system may further include a server configured to receive and collect the vehicle condition monitoring and diagnostic information from the charger, and to analyze the collected vehicle condition monitoring and diagnostic information.

The vehicle condition monitoring and diagnosis system may further include a service terminal configured to request vehicle condition monitoring.

The service terminal may receive a vehicle condition monitoring and diagnosis result, acquired by analysis through the server, and output the vehicle condition monitoring and diagnosis result.

The service terminal may output a battery capacity, charging performance, a software state, and a regular inspection date as the vehicle condition monitoring and diagnosis result.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which.

Figure 1:
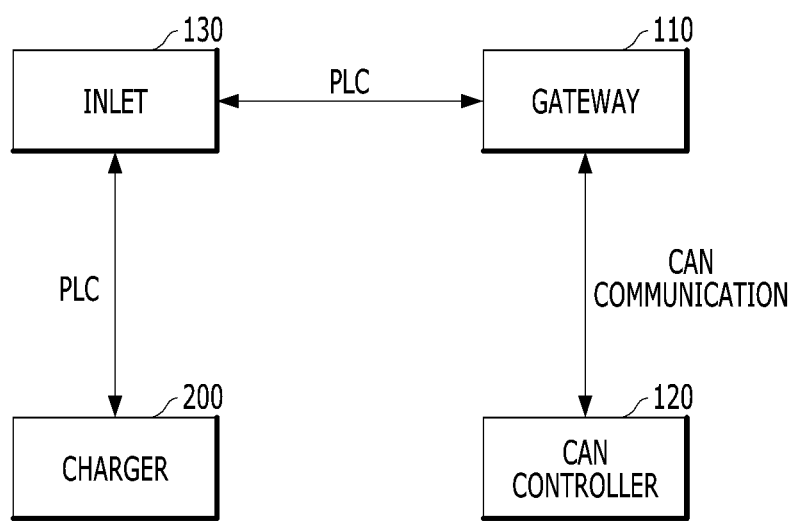
FIG. 1 is a block diagram illustrating a configuration of conventional electric vehicle charging technology.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description of the forms, it will be understood that the suffixes "module" and "unit" used in elements are provided or used interchangeably only in consideration of ease in preparation of the description, and do not have discriminative meanings or functions.

In the following description of the forms, it will be understood that, when positional relations are expressed, for example, when an element is "on or under" or "in front of or behind" another element, the two elements may directly contact each other, or one or more other elements may be interposed between the two elements.

In addition, in the following description of the elements, when elements are described, the terms "first", "second", "A", "B", "(a)", "(b)", etc. may be used. It will be understood that these terms are only to discriminate one element from other elements, and do not limit the nature, sequence or order of the corresponding element. In the following description of the forms, it will be understood that, when an element is "connected to", "coupled to" or "combined with" another element, the element may be directly connected or coupled to the other element, or one or more other elements may be interposed between the two elements.

Further, in the following description of the forms, the terms "including", "having", etc. will be interpreted as indicating the presence of one or more other characteristics, numbers, steps, operations, elements or parts stated in the specification or combinations thereof, and do not exclude presence of characteristics, numbers, steps, operations, elements, parts or combinations thereof, or possibility of adding the same, unless otherwise stated. All terms including technical or scientific terms have the same meanings as meanings generally understood by those skilled in the art in which the present disclosure pertains, unless otherwise defined. In the following description of the forms, generally used terms, such as terms defined in dictionaries, will be interpreted as having meanings coinciding with contextual meanings in the related art, and are not be interpreted as having ideal or excessively formal meanings, unless clearly defined.

In a vehicle condition monitoring and diagnosis method and system using a charger in accordance with the present disclosure, a gateway to control charging in a vehicle is connected to all ECUs of the vehicle through a controller area network (CAN) and connected to the charger through power line communication (PLC) and may thus process vehicle condition monitoring and diagnosis signals simultaneously with performing charging in the vehicle.

Figure 2:
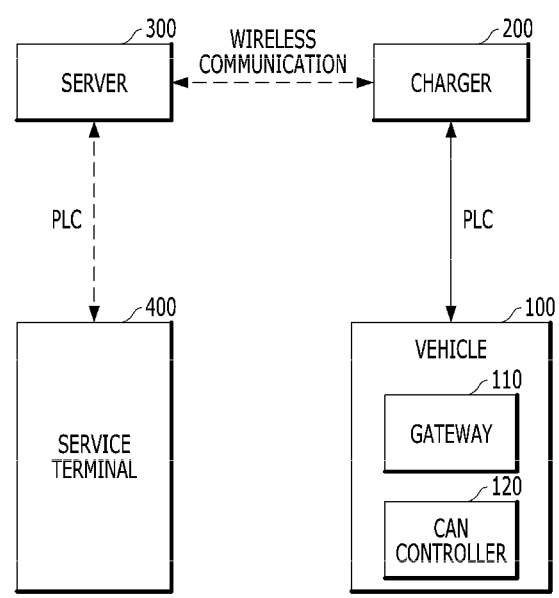
FIG. 2 is a block diagram illustrating a vehicle condition monitoring and diagnosis system using a charger in accordance with one form of the present disclosure.

FIG. 2 is a block diagram illustrating a vehicle condition monitoring and diagnosis system using a charger in accordance with one form of the present disclosure.

Referring to FIG. 2, the vehicle condition monitoring and diagnosis system may include a vehicle 100, a charger 200, a server 300 and a service terminal 400.

The vehicle 100 may include a gateway 110 and a CAN controller 120. Further, the vehicle 100 may include a battery (not shown) to supply power to a driving motor.

The gateway 110 may transmit charging information to the charger 200 through PLC, and control charging of the vehicle 100 based on the charging information.

The gateway 110 may transmit charging information received from the charger 200 to the CAN controller 120 applied to the vehicle 100 and control charging of the vehicle 100. The gateway 110 may transceive data through CAN communication with the CAN controller 120 of the vehicle 100.

The gateway 110 may receive a vehicle diagnosis request signal from the charger 200. The gateway 110 may perform vehicle condition monitoring in response to a vehicle diagnosis request. In the vehicle condition monitoring, a fault code and diagnostic information of the vehicle 100, service data, and version information of vehicle condition monitoring software may be confirmed.

The gateway 110 may request charger information from the charger 200. If the gateway 110 receives the charger information, the gateway 110 may confirm whether vehicle condition monitoring and diagnosis may be performed through the charger information.

If the gateway 110 receives a request for vehicle condition monitoring and diagnostic information from the charger 200, the gateway 110 may perform message segment identifier (SID) filtering. Such message SID filtering may be performed only on a predetermined message which is determined in advance. That is, the message SID filtering may be performed so that messages which are not determined in advance are not transmitted and received. Therefore, communication of only the predetermined message may be carried out between the vehicle 100 and the charger 200 through the message SID filtering.

The gateway 110 may selectively receive information necessary for vehicle condition monitoring and diagnosis in the vehicle 100 through the message SID filtering, and transmit a CAN signal to request the received information to the CAN controller 120 of the vehicle 100. Thereafter, the gateway 110 may receive the vehicle condition monitoring and diagnostic information from the CAN controller 120 of the vehicle 100 through a CAN signal.

The gateway 110 may convert the received CAN signal into an Ethernet message corresponding to the vehicle condition monitoring and diagnostic information.

The gateway 110 may be connected to a communication socket to transmit and receive Ethernet messages from and to the charger 200. The gateway 110 may transmit the vehicle condition monitoring and diagnostic information as an Ethernet message to the charger 200 through the communication socket.

For example, the communication socket may be a TCP/IP socket. The TCP/IP socket may be a socket for Ethernet message transmission and reception to separately perform vehicle condition monitoring and diagnosis communication. Communication through the TCP/IP socket may be second communication along a wired communication path between the gateway 110 and the charger 200.

In the gateway 110, ports may be separated from each other based on software so that a first port may maintain a charging function and a second port may perform a diagnostic information transmission function.

The CAN controller 120 may include a battery management system (BMS), an on board charger (OBC), a vehicle control unit (VCU), etc.

For example, the gateway 110 may request vehicle condition monitoring and diagnostic information from the BMS using CAN communication through the message SID filtering. Thereafter, the gateway 110 may receive the vehicle condition monitoring and diagnostic information from the BMS through CAN communication and convert the vehicle condition monitoring and diagnostic information into an Ethernet message. The gateway 110 may transmit the Ethernet message to the charger 200 through the TCP/IP socket. If the charger 200 is connected to the gateway 110 through PLC, the charger 200 may transmit an Ethernet signal and thus request vehicle diagnosis. Such PLC may be first communication along the wired communication path between the gateway 110 and the charger 200.

The charger 200 may receive vehicle condition monitoring and diagnostic information from the gateway 110. The charger 200 may transmit the vehicle condition monitoring and diagnostic information received from the gateway 110 to the server 300.

The charger 200 may receive a vehicle condition monitoring request from the server 300. The server 300 may receive the vehicle condition monitoring and diagnostic information from the charger 200 and then collect the vehicle condition monitoring and diagnostic information. The server 300 may analyze the collected vehicle condition monitoring and diagnostic information, and may transmit a result of analysis of the vehicle condition monitoring and diagnostic information to the service terminal 400.

The service terminal 400 may perform a wireless communication function with the server 300. The service terminal 400 may request vehicle condition monitoring from the charger 200 through the server 300. The service terminal 400 may receive a diagnosis result acquired by analyzing the vehicle condition monitoring and diagnostic information by the server 300, and output the diagnosis result. For example, the service terminal 400 may output a battery capacity, charging performance, a software state, a regular inspection date, etc.

Figure 3:
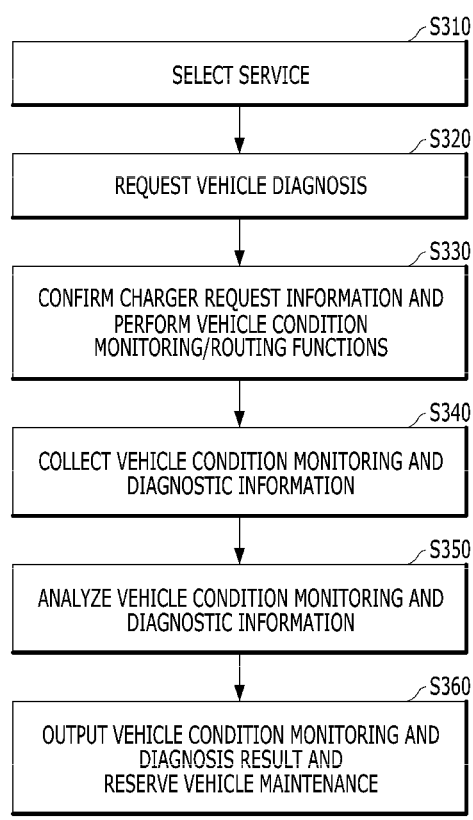
FIG. 3 is a flowchart illustrating a vehicle condition monitoring and diagnosis method using a charger in accordance with one form of the present disclosure.

FIG. 3 is a flowchart illustrating a vehicle condition monitoring and diagnosis method using a charger in accordance with one form of the present disclosure.

Referring to FIG. 3, a user may select a vehicle condition monitoring and diagnosis service using the charger 200 through the service terminal 400 (Operation S310).

In the vehicle condition monitoring and diagnosis service selected through the service terminal 400, the server 300 may request vehicle diagnosis from the charger 200, and the charger 200 may transmit charger request information to the gateway 110 in the vehicle 100 through an Ethernet signal (Operation S320).

The gateway 110 may perform a charging function, confirm the charger request information, transmit a vehicle condition monitoring and diagnosis request to the CAN controller 120, and monitor the CAN controller 120. Thereafter, the gateway 110 may convert CAN information received from the CAN controller 120 into an Ethernet signal and transmit the Ethernet signal to the charger 200. Here, the gateway 110 may perform a routing function (Operation S330).

The charger 200 may collect vehicle condition monitoring and diagnostic information transmitted by the gateway 110 (Operation S340).

The server 300 may analyze the vehicle condition monitoring and diagnostic information received from the charger 200, and transmit a result of analysis to the service terminal 400 (Operation S350).

The service terminal 400 may output a vehicle condition monitoring and diagnosis result acquired by analyzing the vehicle condition monitoring and diagnostic information by the server 300. Thereafter, the service terminal 400 may receive a vehicle maintenance reservation from the user (Operation S360).

Figure 4:
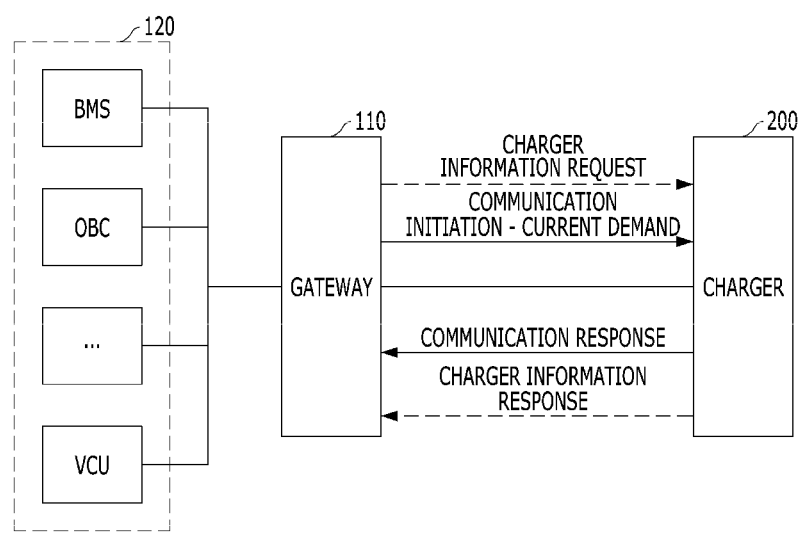
FIGS. 4 to 6 are views illustrating a vehicle condition monitoring and diagnosis logic using a charger in accordance with one form of the present disclosure.
Figure 5:
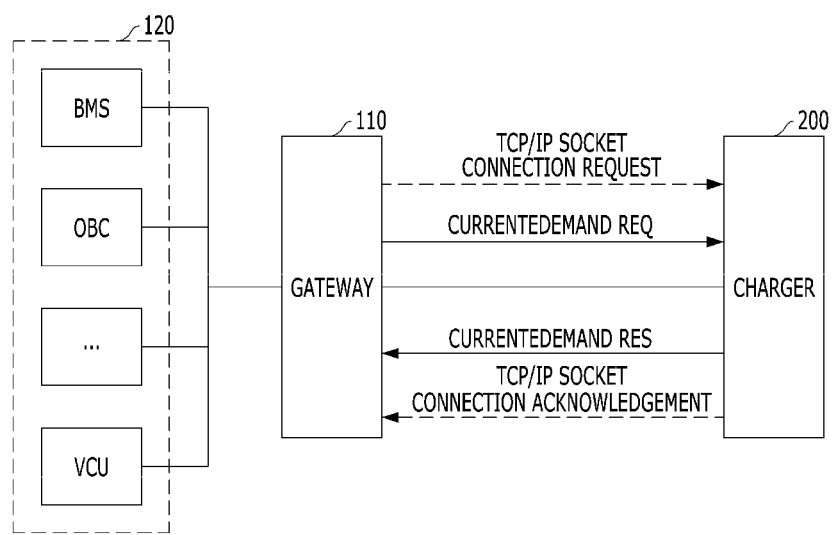
Figure 6:
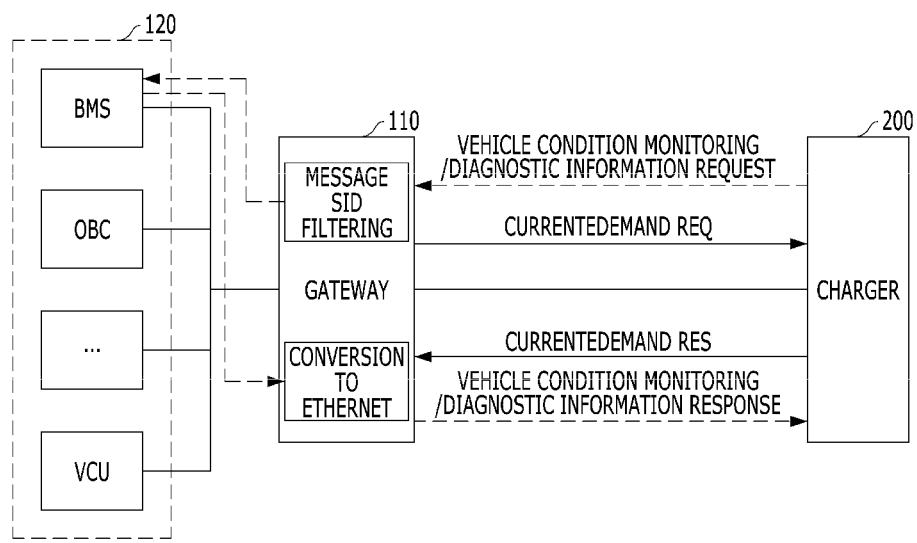

FIGS. 4 to 6 are views illustrating a vehicle condition monitoring and diagnosis logic using a charger in accordance with one form of the present disclosure.

FIGS. 4 to 6 illustrate a flow of operations of the vehicle condition monitoring and diagnosis logic according to a time sequence.

Referring to FIG. 4, the gateway 110 may perform operations up to demand of current after initiation of communication with the charger 200. The charger 200 may respond to communication with the gateway 110.

Further, the gateway 110 may request charger information from the charger 200. Thereafter, the charger 200 may transmit the charger information to the gateway 110 in response to the charger information request. The charger information may include charger infrastructure information. Thereafter, the gateway 110 may receive the charger information and confirm whether or not the charger 200 can perform vehicle condition monitoring and diagnosis.

Referring to FIG. 5, after demand of current, if the charger 200 can perform vehicle condition monitoring and diagnosis, the gateway 110 may separately perform vehicle condition monitoring and diagnosis communication and request connection to the TCP/IP socket to transceive an Ethernet message from the charger 200.

The charger 200 may perform connection to the TCP/IP socket and transmit a connection acknowledgement signal to the gateway 110.

Referring to FIG. 6, if the gateway 110 and the charger 200 are connected through the TCP/IP socket, the charger 200 may request vehicle condition monitoring and diagnostic information from the gateway 110.

The gateway 110 may confirm information necessary for vehicle condition monitoring and diagnosis in the vehicle 100 through message SID filtering in response to the request from the charger 200. Thereafter, the gateway 110 may transmit a CAN signal to request the confirmed information to the CAN controller 120 of the vehicle 100.

The gateway 110 may receive information corresponding to a request from the CAN controller 120 and convert the received information into an Ethernet message. After that, the gateway 110 may transmit the Ethernet message to the charger 200.

Figure 7:
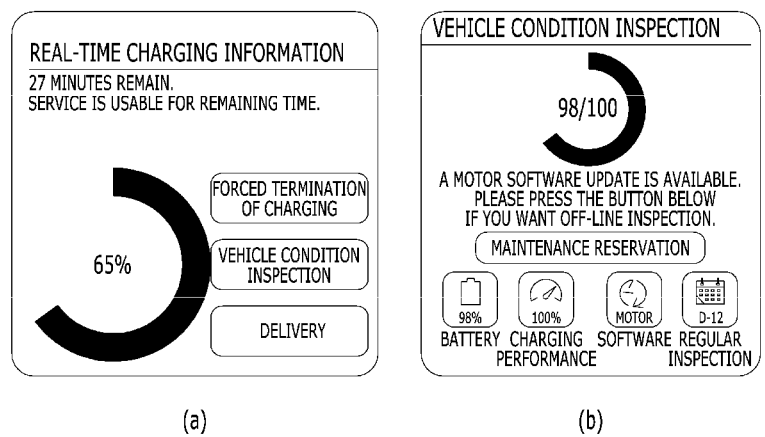
FIGS. 7(*a*) and 7(*b*) are views illustrating a display of a service terminal in accordance with one form of the present disclosure.

FIGS. 7(*a*) and 7(*b*) are views illustrating a display of the service terminal in accordance with one form of the present disclosure.

Referring to FIG. 7(*a*), the service terminal 400 may output real-time charging information according to operation of software. The service terminal 400 may display a remaining capacity of the battery and a guide message.

For example, as the guide message, a message stating "27 minutes remain. Service is usable for remaining time." may be displayed. Further, the service terminal 400 may display service icons indicating forced termination of charging, vehicle condition inspection, and delivery, etc.

Referring to FIG. 7(*b*), if the service terminal 400 receives vehicle condition monitoring and diagnostic information in response to a vehicle condition inspection service request, the service terminal 400 may output vehicle condition inspection information.

If the vehicle condition inspection is completed, the service terminal 400 may output a service provided after output of the information regarding the remaining capacity of the battery and the vehicle condition inspection information of the vehicle 100.

For example, the service terminal 400 may output a guide message stating, "A motor software update is available. Please press the button below if you want off-line inspection". In addition, the service terminal 400 may display an icon corresponding to a maintenance reservation service.

Further, the service terminal 400 may display icons indicating a battery capacity, charging performance, a software state, and a regular inspection date, etc., as a diagnosis result.

The above-described method in accordance with the form of the present disclosure may be recorded as a program which may be implemented in computers, and be stored in a computer readable recording medium and, for example, computer readable recording media may include a ROM, a RAM, a CD-ROM, a magnetic tape, a floppy disk, an optical data storage device, etc. The computer readable recording media may be distributed in computer systems connected by a network and, herein, computer readable code may be stored and executed in a distributed manner. Further, functional programs, code and code segments to implement the above-described method may be easily deduced by programmers in the art in which the forms pertain.

As is apparent from the above description, effects of a vehicle condition monitoring and diagnosis method and system using a charger in accordance with the present disclosure will be described below.

First, the vehicle condition monitoring and diagnosis method and system in accordance with the present disclosure may provide vehicle inspection and condition monitoring information to a customer using conventional wirings and gateway for charging without change of hardware during charging of an eco-friendly vehicle.

Second, the vehicle condition monitoring and diagnosis method and system in accordance with the present disclosure may inhibit occurrence of conventional overlapping related to charging through use of a different port and connection to a different socket from those used in transmission and reception of charging-related information executed through PLC lines, and inhibit hacking of communication from the outside in terms of security through message SID filtering requested by the charger, performed by the gateway.

Third, the vehicle condition monitoring and diagnosis method and system in accordance with the present disclosure may provide vehicle condition and diagnostic information to the customer for a vehicle charging time so as to reduce a time taken to diagnose the vehicle, and improve simple measurement of the eco-friendly vehicle.

While this present disclosure has been described in connection with what is presently considered to be practical exemplary forms, it is to be understood that the present disclosure is not limited to the disclosed forms, but, on the contrary, it is intended to cover various modification and equivalent arrangements included within the spirit and scope of the present disclosure.

What is claimed is:

1. A vehicle condition monitoring and diagnosis method for a vehicle with a battery and a driving motor using a charger, the vehicle monitoring and diagnosis method comprising the steps of:
preparing a wired communication path using a charging cable between a gateway and the charger of the vehicle;
initiating first communication to charge the battery to supply power to the driving motor between the gateway and the charger through the wired communication path using the charging cable;
initiating charging according to a result of the first communication;
receiving, by the gateway, a vehicle condition monitoring and diagnosis request from the charger through the first communication;
connecting the gateway to the charger through second communication to transmit vehicle condition monitoring and diagnostic information separately from the charging through the wired communication path using the charging cable when the gateway is capable of performing vehicle condition monitoring and diagnosis according to the vehicle condition monitoring and diagnosis request;
performing message filtering, in response to the vehicle condition monitoring and diagnosis request from the charger;
selectively receiving information necessary for the vehicle condition monitoring and diagnosis from the vehicle through the message filtering and transmitting a controller area network (CAN) signal to request the received information to a CAN controller of the vehicle;
receiving the vehicle condition monitoring and diagnostic information from the CAN controller of the vehicle through the CAN signal; and
converting the received CAN signal into an Ethernet message.

2. The vehicle condition monitoring and diagnosis method according to claim 1, wherein the receiving, by the gateway, the vehicle condition monitoring and diagnosis request from the charger through the first communication comprises:
when the charger and the gateway are connected by the first communication, receiving, by the gateway, vehicle condition monitoring and diagnosis request information transmitted by the charger through an Ethernet signal.

3. The vehicle condition monitoring and diagnosis method according to claim 1, further comprising the steps of receiving, by the gateway, charger information transmitted by the charger through the first communication and confirming whether the charger is capable of performing the vehicle condition monitoring and diagnosis through the charger information.

4. The vehicle condition monitoring and diagnosis method according to claim 1, wherein the second communication is configured to transceive Ethernet messages through a TCP/IP socket as a communication socket.

5. The vehicle condition monitoring and diagnosis method according to claim 1, further comprising the steps of:
receiving and collecting, by a server, the vehicle condition monitoring and diagnostic information from the charger; and
analyzing, by the server, the collected vehicle condition monitoring and diagnostic information.

6. The vehicle condition monitoring and diagnosis method according to claim 5, further comprising the step of requesting, by a service terminal, vehicle condition monitoring.

7. The vehicle condition monitoring and diagnosis method according to claim 6, further comprising the steps of:
receiving, by the service terminal, a vehicle condition monitoring and diagnosis result acquired by analysis through the server; and
outputting, by the service terminal, the vehicle condition monitoring and diagnosis result.

8. The vehicle condition monitoring and diagnosis method according to claim 7, wherein the outputting, by the service terminal, the vehicle condition monitoring and diagnosis result comprises outputting a battery capacity, charging performance, a software state, and a regular inspection date.

9. A non-transitory computer readable recording medium having a program recorded thereon, the program to direct a processor to perform acts of:
preparing a wired communication path using a charging cable between a gateway and a charger of a vehicle;
initiating first communication between the gateway and the charger through the wired communication path using the charging cable to charge the battery of the vehicle to supply power to the driving motor of the vehicle;
initiating charging according to a result of the first communication;
receiving, by the gateway, a vehicle condition monitoring and diagnosis request from the charger through the first communication;
connecting the gateway to the charger through second communication to transmit vehicle condition monitoring and diagnostic information separately from the charging through the wired communication path using the charging cable when the gateway is capable of performing vehicle condition monitoring and diagnosis according to the vehicle condition monitoring and diagnosis request;
performing message filtering, in response to the vehicle condition monitoring and diagnosis request from the charger;
selectively receiving information necessary for the vehicle condition monitoring and diagnosis from the vehicle through the message filtering and transmitting a controller area network (CAN) signal to request the received information to a CAN controller of the vehicle;
receiving the vehicle condition monitoring and diagnostic information from the CAN controller of the vehicle through the CAN signal; and
converting the received CAN signal into an Ethernet message.

10. A vehicle condition monitoring and diagnosis system for a vehicle with a battery and a driving motor using a charger, the vehicle condition monitoring and diagnosis system comprising:
the charger configured to perform vehicle charging; and
the vehicle comprising a gateway and a controller area network (CAN) controller connected to the charger through a wired communication path using a charging cable so as to control charging of the vehicle,
wherein the gateway:
initiates first communication to charge the battery to supply power to the driving motor between the gateway and the charger through the wired communication path using the charging cable;
receives a vehicle condition monitoring and diagnosis request from the charger through the first communication when charging is initiated according to a result of the first communication;
is connected to the charger through second communication to transmit vehicle condition monitoring and diagnostic information separately from the charging through the wired communication path using the charging cable when the gateway is capable of performing vehicle condition monitoring and diagnosis according to the vehicle condition monitoring and diagnosis request;
performs message filtering, in response to the vehicle condition monitoring and diagnosis request from the charger;
selectively receives information necessary for the vehicle condition monitoring and diagnosis from the vehicle through the message filtering and transmits a CAN signal to request the received information to a CAN controller of the vehicle;
receives the vehicle condition monitoring and diagnostic information from the CAN controller of the vehicle through the CAN signal; and
converts the received CAN signal into an Ethernet message corresponding to the vehicle condition monitoring and diagnostic information.

11. The vehicle condition monitoring and diagnosis system according to claim 10, wherein the gateway receives vehicle condition monitoring and diagnosis request information transmitted by the charger through an Ethernet signal when the charger and the gateway are connected by the first communication.

12. The vehicle condition monitoring and diagnosis system according to claim 10, wherein the gateway receives charger information transmitted by the charger through the first communication and confirms whether the charger is capable of performing the vehicle condition monitoring and diagnosis through the charger information.

13. The vehicle condition monitoring and diagnosis system according to claim 10, wherein the second communication is configured to transceive Ethernet messages through a TCP/IP socket as a communication socket.

14. The vehicle condition monitoring and diagnosis system according to claim 10, further comprising a server configured to receive and collect the vehicle condition monitoring and diagnostic information from the charger, and to analyze the collected vehicle condition monitoring and diagnostic information.

15. The vehicle condition monitoring and diagnosis system according to claim 14, further comprising a service terminal configured to request vehicle condition monitoring.

16. The vehicle condition monitoring and diagnosis system according to claim 15, wherein the service terminal receives a vehicle condition monitoring and diagnosis result, acquired by analysis through the server, and outputs the vehicle condition monitoring and diagnosis result.

17. The vehicle condition monitoring and diagnosis system according to claim 16, wherein the service terminal outputs a battery capacity, charging performance, a software state, and a regular inspection date as the vehicle condition monitoring and diagnosis result.

* * * * *